Jan. 8, 1957 M. V. GRIFFIS 2,776,860
AUTOMATIC SPRINKLING DEVICE
Filed Feb. 21, 1955 2 Sheets-Sheet 1
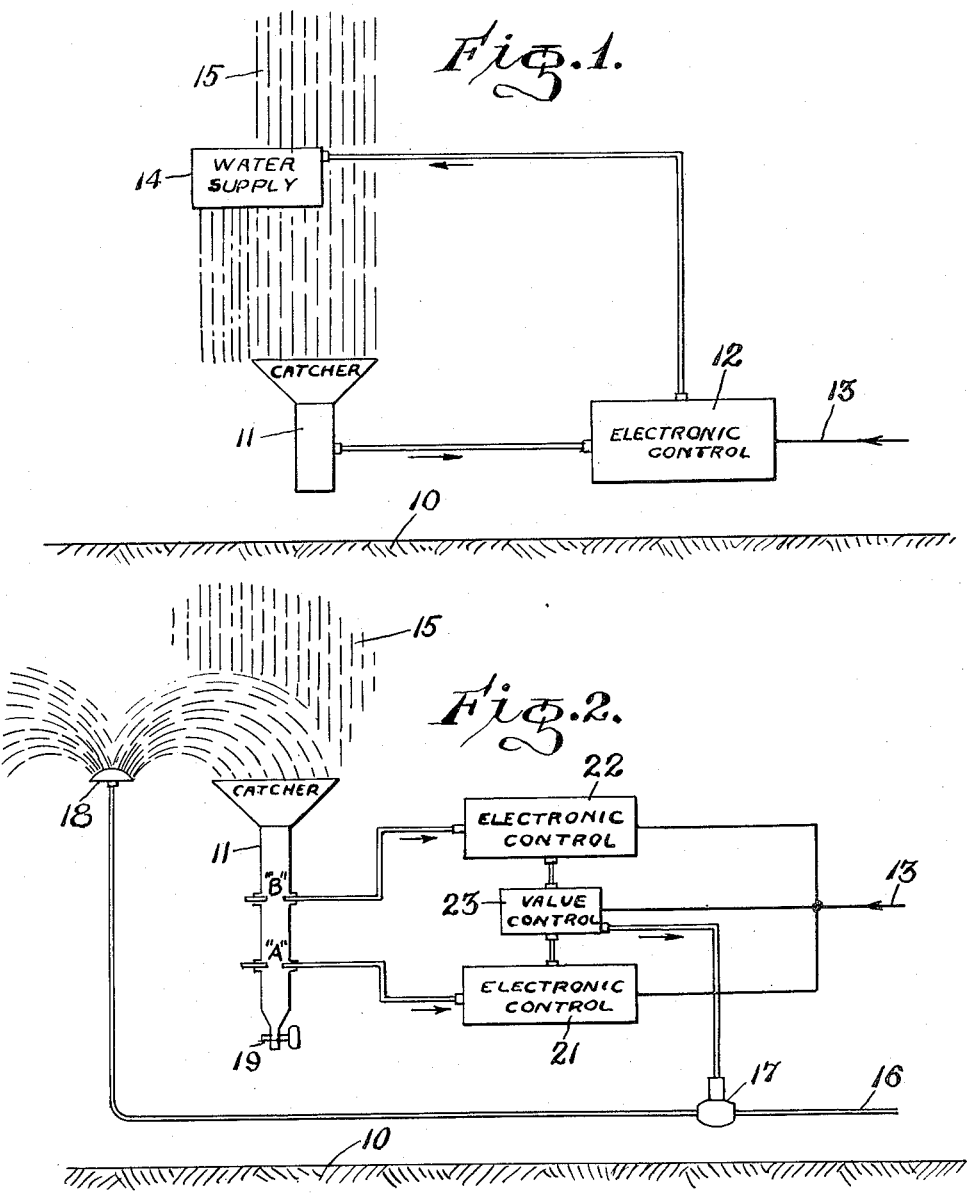
INVENTOR.
MERLE V. GRIFFIS

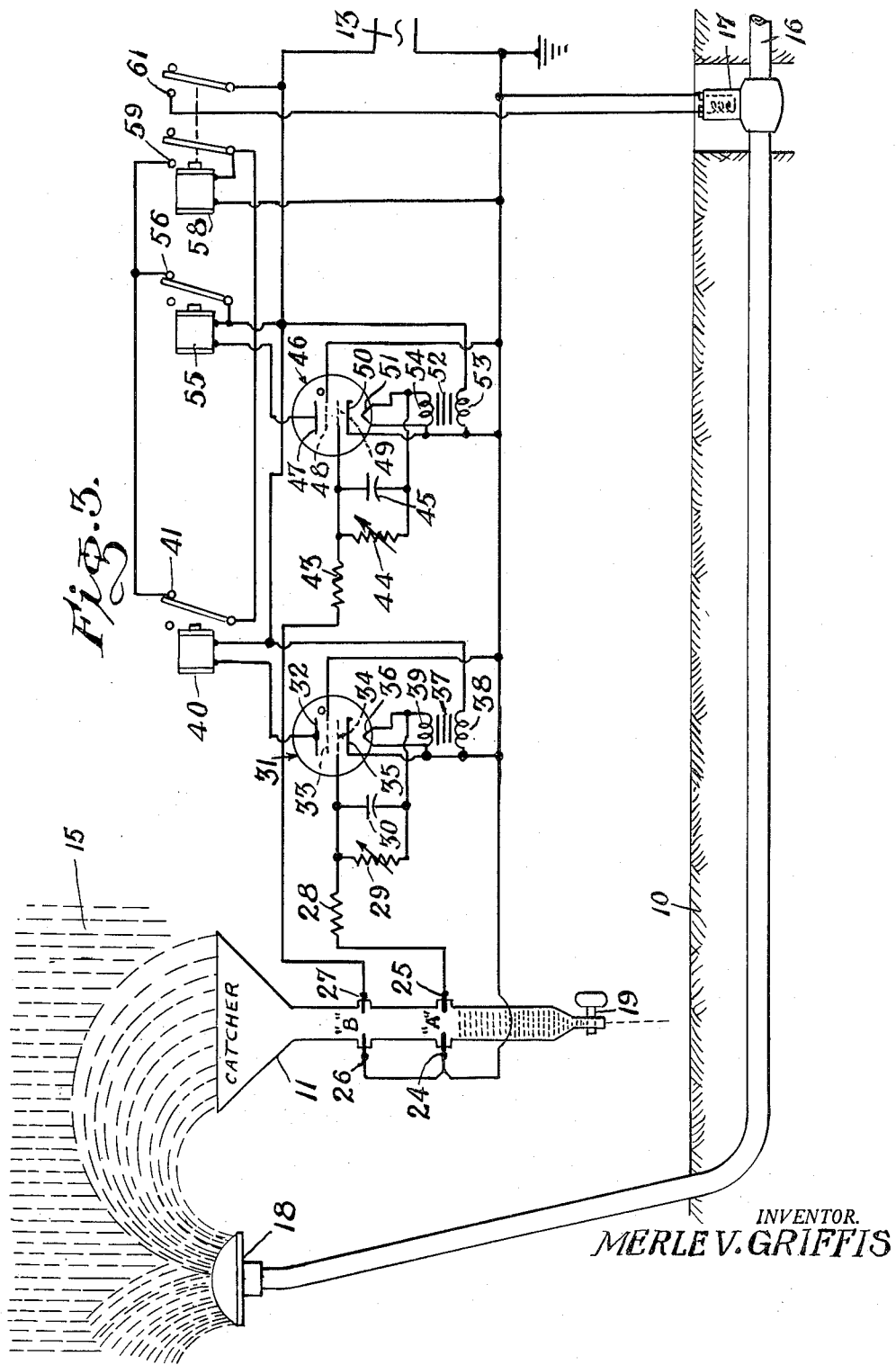

United States Patent Office 2,776,860
Patented Jan. 8, 1957

2,776,860

AUTOMATIC SPRINKLING DEVICE

Merle V. Griffis, Daytona Beach, Fla.

Application February 21, 1955, Serial No. 489,562

4 Claims. (Cl. 299—25)

This invention relates to sprinkling devices.

It is an object of the present invention to provide improved means for sprinkling lawns and crops.

It is another object of the present invention to provide automatic means, using electronic controls for controlling the operation of the sprinkler heads.

It is still another object of the present invention to provide an automatic sprinkling device including an automatic control adapted to permit a pre-determined amount of water to fall on the lawn or crops.

It is still another object of the invention to provide an automatic sprinkling device which includes automatic means for determining the time-rate of rain water falling from the clouds whereby said means will automatically control the amount of water flowing from the sprinkler heads in order to make up for the deficiency of natural rain water.

Other objects of the present invention are to provide an automatic sprinkling device bearing the above objects in mind which is of simple construction, inexpensive to manufacture, has a minimum number of parts, is easy and efficient in operation.

For other objects and a better understanding of the invention, reference may be had to the following detailed description taken in connection with the accompanying drawing, in which:

Figure 1 is a diagrammatic view illustrating the basic concept of the invention;

Fig. 2 is a diagrammatic view illustrating the general form of the invention; and Fig. 3 is a diagrammatic view illustrating the specific circuit embodying the features of the invention.

Referring now more in detail to the drawing, and more particularly to Fig. 1, lawn grass or crops 10 receive water from the rain 15 or the water supply illustrated diagrammatically at 14. The water supply 14 is intended to illustrate all possible arrangements of sprinkler heads and associated water supplies. As shown in Fig. 1, a portion of the rain 15 and a portion of the water falling from water supply 14 will fall into the catcher illustrated diagrammatically at 11. The catcher 11 is electrically responsive to the time-rate of water falling into it, as will hereinafter become clear.

When the electronic control indicated diagrammatically at 12 and supplied or powered by electrical supply 13, senses through the catcher 11 that additional water is required, it operates the water supply 14, thus permitting the water to fall on the lawn or crops. When the electronic control 12 senses through the catcher 11 that sufficient water has fallen, it operates water supply 14 to shut off the flow of water, as will hereinafter become clear.

The foregoing illustrates the basic concept of the invention in its broadest aspects.

Referring now particularly to Fig. 2, there is shown a specific type of catcher 11 including an open, funnel-shaped top constructed of non-conductive material such glass and containing the vertically spaced sets of electrodes A and B as well as an adjustable orifice 19 at the bottom. In operation, the orifice 19 is adjusted so that the water drips out of the catcher at a relatively slow rate.

The water supply pipe 16 connects to the sprinkler head 18 of any suitable construction through the solenoid valve 17. It will be noted that the sprinkler head 18 is positioned so that part of the water falling therefrom will be deposited in the catcher 11. When the water in the catcher 11 rises to the B electrodes, electronic switch 22 will operate the valve control 23 which, in turn, operates the solenoid valve 17 whereby to cut off the flow of water to the sprinkler head 18. When the water in catcher 11 rises to the B electrodes therefore the supply through the pipe 16 will be cut off. The water now slowly drips from the catcher 11 through the adjustable orifice 19. If, for example, water should now start to fall from the rain clouds, for example rain 15, it will merely accumulate in the catcher 11. As soon as the water within the catcher recedes below the level of the A electrodes, electronic switch 21, as will hereinafter become clear, will operate the valve control 23 which in turn operates the solenoid valve 17, to again permit the water to flow from the sprinkler head 18. This flow continues until the water in the catcher 11 rises to the level of the B electrodes, which again shuts off the flow of water, as previously described.

Thus, due to the adjustable orifice 19, water must be supplied either from the sprinkler 18 or rain 15 to the catcher at a pre-determined rate which must be just equal to the loss through orifice 19 to maintain the level of water within the catcher at a static condition. If the rate of depositing of water within the catcher is greater than the escape through orifice 19, the level will rise until it reaches the electrode B, at which point the solenoid valve 17 will close off the supply of water to the sprinkler head 18. This will reduce the rate of water falling on the lawn or crops by the amount supplied by the sprinkler head 18, so that the lawn 10 will be supplied entirely by the rain 15. Should the rain 15 fail to supply the pre-determined or required amount, the level of water within the catcher will drop, and when it recedes below the electrodes A, the valve 17 will again be opened to cut in the supply through the sprinkler head 18 to make up for the amount previously supplied by the rain 15. Thus, there has been provided improved means for sprinkling lawns and crops, including automatic means using electronic control for controlling the sprinkling operation of the sprinkling heads. It should also be apparent that there has been provided an automatic controller to permit a predetermined amount of water to fall on the lawn or crops, the device including automatic means for determining the time rate of rain water falling from the clouds whereby said means will automatically control the amount of water flowing from the sprinkler heads so as to make up for the deficiency of natural rain water.

Referring now particularly to Fig. 3, it will be seen that the electrodes A include the electrodes 24 and 25. It will also be seen that the electrodes B include the electrodes 26 and 27. The circuit of Fig. 3 includes essentially two electronic switches together with a valve control.

The first electronic switch includes the afore-mentioned electrodes 24, 25, a resistor 28 for limiting the current through the electrodes, an adjustable resistor 29 for adjusting the sensitivity of the circuit, the capacitor 30, the thyratron tube indicated generally at 31, the transformer 37 and the relay 40 having the contact 41. The tube 31 includes the anode 32, grid shield 33, control grid 34 and a thermionic cathode 35, and a cathode heater 36. The transformer 37 includes the primary 38 and the secondary 39 which latter supplies a relatively low potential to the heater element 36.

The second electronic switch includes the afore-mentioned electrodes 26, 27, the resistor 43 for limiting the current through the electrodes, the adjustable resistor 44 for adjusting the sensitivity of the circuit, the capacitor 45, the thyratron tube 46, the transformer 52, and the relay 55 having the contact 56. The tube 46 includes the anode 47, the grid shield 48, the control grid 49, thermionic cathode 50 and a cathode heater 51. The transformer 52 includes a primary 53 and a secondary 54 which latter supplies a relatively low potential to the heater element 51.

The valve control comprises the relay 58 having contacts 59 and 61. Electrical energy is supplied to the afore-mentioned circuit by alternating current supply 13, one side of which is connected to the ground.

In the operation of the electronic switches, a bias voltage is supplied to the control grid 34 of tube 31 by the connection through the adjustable resistor 29 to one side of the secondary 39 of the transformer 37. Bias voltage is supplied in a similar manner to the control grid 49 of tube 46.

In describing the operation of the automatic sprinkling device, let us assume that to begin with the catcher 11 is devoid of water. In this condition, relays 40 and 55 will both be de-energized, with the contacts 41 and 56 respectively being closed. The relay 58 will now be energized through contacts 41 and 56, thus placing contacts 59 and 61 in the closed position. The closing of contacts 61 completes the circuit and energizes the solenoid valve 17, which opens the water supply 16 to the sprinkler head 18. A portion of the water from the sprinkler head 18 will fall into the catcher 11. The water level in the catcher will slowly rise to the level where it contacts the electrodes 24, 25. This completes the circuit across the grid 34 and cathode 35, reduces the bias and causes tube 31 to fire, thus energizing relay 40 and opening contact 41. Relay 58 continues to remain energized with current flowing through its own contact 59, and through contact 56. The water level continues to rise and contacts electrodes 26, 27. This completes the circuit across control grid 49 and cathode 50, reduces the bias, and causes the tube 46 to fire, thus energizing relay 55 and opening contact 56. The opening of contact 56 de-energizes relay 58, opening contacts 59 and 61. The opening of contact 61 de-energizes the solenoid valve 17, shutting off the flow of water from water supply 16 to the sprinkler head 18.

The water now slowly drips from the catcher 11 through the orifice 19. When the water level recedes below electrodes 26, 27, this restores the bias to tube 46, preventing it from firing, and de-energizes the relay 55 causing contact 56 to close. At this point the relay 58 remains de-energized because contact 41 is open, thus keeping solenoid valve 17 de-energized and the water supply 16 cut off from the sprinkler head 18. If rain should fall in the meantime, water will merely accumulate in the catcher. When the water has receded below electrodes 24, 25 this restores the bias to the tube 31, preventing it from firing, and de-energizes the relay 40 causing the contact 41 to close. Relay 58 is now energized through the contact 41 and contact 56, thus closing contacts 59 and 61. The closing of contact 61 completes the circuit and energizes solenoid valve 17, which opens the water supply 16 to the sprinkler head 18. The automatic control cycle now repeats itself as described above.

While various changes may be made in the detail construction, it shall be understood that such changes shall be within the spirit and scope of the present invention as defined by the appended claims.

What I claim as new and desire to protect by Letters Patent of the United States is:

1. An automatic sprinkling device comprising sprinkler means, conduit means for supplying water to said sprinkler means, solenoid valve means controlling said conduit means, and control means for said solenoid valve means responsive to the quantity of rain water, said control means comprising catcher means adapted to collect the rain water, said catcher means including an adjustable outlet permitting the flow of collected rain water therethrough, and a pair of vertically spaced switches therewithin adapted to be opened and closed in accordance with the level of water collected therewithin, valve control means controlling said solenoid valve means, first electronic control means connected in series with one of said vertically spaced switches, and second electronic control means connected in series with the other of said switches, each of said electronic control means controlling said valve control means.

2. An automatic sprinkling device comprising sprinkler means, conduit means for supplying water to said sprinkler means, solenoid valve means controlling said conduit means, relay means controlling said solenoid valve means, and control means responsive to the quantity of rain water controlling said relay means, said control means comprising catcher means adapted to collect rain water therewithin and including an adjustable outlet, and a pair of vertically spaced sets of contacts adapted to be opened and closed depending on the level of water collected within said catcher means, a first electronic switch connected in series with one of said pair of contacts, a second electronic switch connected in series with the other of said contacts, said switches controlling said relay means.

3. An automatic sprinkling device according to claim 2, each of said electronic switch means comprising a resistor for limiting the current through said contacts, an adjustable resistor for adjusting the sensitivity of the switch circuit, a capacitor, a thyratron tube, a transformer, and a relay.

4. An automatic sprinkling device according to claim 3, each of said thyratron tubes including an anode, a grid shield, a control grid, a thermionic cathode, and a cathode heater, each of said transformers including a primary and a secondary, said secondary supplying the relatively low potential to said heater.

References Cited in the file of this patent
UNITED STATES PATENTS

| | | |
|---|---|---|
| 1,822,901 | Mulhall | Sept. 15, 1931 |
| 2,004,194 | Mulhall | June 11, 1935 |
| 2,202,197 | Ewerty | May 28, 1940 |
| 2,577,337 | Lancaster | Dec. 4, 1951 |
| 2,611,643 | Higgins | Sept. 23, 1952 |